United States Patent
Purdy et al.

[11] Patent Number: 6,115,719
[45] Date of Patent: Sep. 5, 2000

[54] JAVA COMPATIBLE OBJECT ORIENTED COMPONENT DATA STRUCTURE

[75] Inventors: H. Cameron Purdy, Wilmington; Yevgeniy Gleyzer, Lexington, both of Mass.

[73] Assignee: Revsoft Corporation, Andover, Mass.

[21] Appl. No.: 09/196,995

[22] Filed: Nov. 20, 1998

[51] Int. Cl.[7] .............................. G06F 15/18; G06F 17/30
[52] U.S. Cl. ............................................ 707/103; 707/100
[58] Field of Search ................................... 707/103, 100, 707/102; 395/702, 703, 707

[56] References Cited

U.S. PATENT DOCUMENTS

| | | | |
|---|---|---|---|
| 5,313,630 | 5/1994 | Namioka et al. | 395/600 |
| 5,838,965 | 11/1998 | Kavanagh et al. | 395/614 |
| 5,895,477 | 4/1999 | Orr et al. | 707/517 |
| 5,903,894 | 5/1999 | Reneris | 707/100 |
| 5,905,987 | 5/1999 | Shutt et al. | 707/103 |
| 5,918,052 | 6/1999 | Kruskal et al. | 395/701 |
| 5,953,726 | 9/1999 | Carter et al. | 707/103 |
| 5,978,582 | 11/1999 | McDonald et al. | 395/702 |
| 6,003,038 | 12/1999 | Chen | 707/103 |
| 6,018,741 | 1/2000 | Howland et al. | 707/102 |
| 6,049,665 | 4/2000 | Branson et al. | 395/702 |

*Primary Examiner*—Hosain T. Alam
*Assistant Examiner*—Sanjiv Shah
*Attorney, Agent, or Firm*—Perkins, Smith & Cohen; Jerry Cohen

[57] ABSTRACT

An object-oriented component data structure and method for constructing, extending, assembling, and modifying software components. The inventive component data structure provides a complete definition of a component including its identity, state, behavior, and containment of other components, which are recursively nested instances of the inventive component data structure. The inventive component data structure supports inheritance, such that the definition of a component inherits from the definition of another component; contained component data structures likewise support inheritance. Moreover, the inventive component data structure and resulting software components are compatible with the Java Virtual Machine (JVM), Java Class File, Java Byte Code, JavaBean, and CORBA specifications. The inventive component data structure and method are particularly well suited for providing tools for software development, trouble-shooting, and systems integration. Furthermore, the inventive component data structure minimizes the need for manual changes with respect to customized and localized software components when component revisions are made.

15 Claims, 6 Drawing Sheets

INHERITANCE IN JAVA

IHHERITANCE HIERARCHY

CONTAINMENT IN JAVA

NESTED CONTAINMENT

JAVA COMPILATION

JAVA EXECUTION

EXTRACT COMPONENT DATA
STRUCTURE DELTA

RESOLVE COMPONENT DATA
STRUCTURE DELTA

COMPILATION OF COMPONENT DATA
STRUCTURE TO JAVA BYTE CODE

ALTERNATE COMPILATION OF
COMPONENT DATA STRUCTURE
TO JAVA SOURCE CODE

JAVA COMPATIBLE OBJECT ORIENTED COMPONENT DATA STRUCTURE

FIELD OF THE INVENTION

This invention relates generally to data structures, and more particularly to data structures that are fully compatible with the Java Virtual Machine. Even more particularly, the present invention relates to tools, incorporating these data structures, for designing software components, and constructing software applications.

BACKGROUND OF THE INVENTION

The Java language is well known in the art, and a brief review suffices for the purposes of the present invention. Java is an effective object-oriented programming language that shares many syntactical characteristics of the C and C++ languages. The popularity of the language emanates from a number of features, two of the principal (and related) ones are first that the language is portable, and, second, it is architecturally neutral. For example, some of the standardized features that make Java portable are that:

Java provides the same Application Programmer Interface (API) for all systems;

Java uses the 16-bit Unicode character set that can be used to encode all the symbols of virtually all the world's languages; and Java supports numerical and operand evaluation standards found in most other programming languages.

Architectural neutrality is ensured by standardization on the Java Virtual Machine (JVM). This is a critical and very attractive feature of Java. When Java source code is compiled the usual output is an intermediate code called Java Byte Code UBC); this code is not directly executable. Since JBC is a platform independent standard, there is a need for a platform-specific interpreter or compiler to provide the binary code that actually executes on a specific machine.

The above features of the JVM emanate from its standardized formation of object classes that are platform independent and, via the platform specific interpreter, made compatible and operational with the particular systems. Two standards for such object classes have emerged as the most popular—the JavaBean and CORBA (Common Object Request Broker Architecture) objects. JavaBeans often are graphical controls used in (but not limited to) the construction of a Graphical User Interface (GUI). CORBA objects are capable of bridging language, machine, environment and other such boundaries. Java is described in "The Java Language Specification," Sun Microsystems Inc., JavaBeans are described in the "Java Beans API specification," version 1.00, Sun Microsystems Inc., and CORBA is described in the "Object Management Architecture Guide," 3rd edition, from the Object Management Group, Inc., all of which are incorporated herein by reference.

The widespread adoption of Java and Java compatible software and systems has made it desirable to provide software tools for applications developers that are compatible with the installed systems. The development, deployment and maintenance of large and complex software applications, such as line-of-business and packaged applications, introduce particular problems that are not typically encountered in small-scale projects. Large projects become increasingly difficult, time consuming and error prone, and inefficiencies and limitations of the technologies and derived software tools become more pronounced and noticeable. Consider the following examples:

1. A relatively minor programming change in a product, such as changing the data type returned from a Java method, requires every derived class which implements the method and every other class which invokes the modified method to be manually updated to reflect the change. Other changes are potentially much more destructive; for example, changing the name of the method may cause a conflict if a method further down the inheritance tree has the same name.

2. It is routine for large software applications to be customized (e.g. for specific customers or sites). In prior art systems, customization renders large software applications nearly impossible to maintain. For example, consider a base software application that has been installed for many different customers. Each of these customers will usually change parts of the base application to accommodate their specific needs. The changes are accomplished by making modifications to parts of the program, or in object oriented programming, by modifying the classes of objects in the application. If the application vendor subsequently modifies these classes, and the customer wishes to upgrade the application to incorporate those modifications, then the customer must determine what customizations were made to the original classes and similarly customize the updated classes. (Alternatively, if the vendor's modifications are minor, it may be possible to isolate those changes and apply them to the older but customized version of the classes.) In a large customized application, this work is substantial enough that many customers continue to use out-of-date versions indefinitely. The effort that is required to upgrade a customized application is often larger than the original customization effort. Compounding the cost of upgrading is the potential for introducing new problems into a software application that is already in use.

3. Localization is an additional requirement for many software applications and involves tailoring a software application to the language, input methods, and standards of a specific locale. This may include supporting different units of measurement and financial currencies, fulfilling legal requirements, and displaying dates, times, and currencies in the expected formats. These changes to an application provide challenges similar to those resulting from application customization; however, localization multiplies, rather than simply adding to, the number of potential application configurations, since a localized application can be customized or vice versa.

With respect to this invention, the following four implemented concepts are important. The four are: Identity, behavior, state and containment which are defined and discussed below and are well known terms of art:

Identity is used to exactly specify (to name) a class of objects, for example "button;"

Behavior consists of the operations that a class of objects can perform, for example how a "button" reacts when pressed;

State describes the current attributes of an object, for example the text displayed on a "button;" and Containment refers to a relationship between multiple objects where one object is contained within another, for example, the "button" could be contained within a "window."

In practice, well known in the art, the above items may typically be implemented on a computer display. A "window" is typically a framed area, and a "button" appears as a smaller framed area within the window. The appearance is that of a physical window containing a physical button, where the button can be "pressed" or activated by "clicking" on it.

Inheritance is a central feature of object-oriented programming in general and the Java language in specific. In Java, heredity is substantially limited to the identity and behavior of a class. The Java language lacks the notion of inheritance of state and containment. The state of a Java object is typically held by class variables, which the Java language calls "fields." The value of a field can be specified only in the class that declares the field. Java programs commonly use containment of objects, but not inheritance via the containment.

Object-oriented programs built using the Java language are thus limited by the lack of support for inheritance of state and containment as illustrated below.

Most of the technical terms used herein are defined by Dr. Grady Booch in his book, "Object-Oriented Analysis and Design," 2ed, published by The Benjamin/Cummings Publishing Co., Inc. in 1994, which book is incorporated herein by reference.

Illustrating the inheritance issues with state and continuing with the "button" example, it is expected a "button" would include its display position as part of its state. This implies that the "button" class, or a class that it inherits from, declares position as part of its state. The act of positioning a "button" on a "window" defines the position portion of the state of the "button." Using this example, the limitations of prior art systems become evident:

1. If the aforementioned "button" on the "window" is itself a class (which is to say that this particular "button" on this particular "window" has its own class identity), it cannot define its position, since the position was declared in the "button" super class from which this particular "button" inherits.
2. If the aforementioned "button" on the "window" is simply an instance of a generic "button" class (as in the most common prior art systems), then inheritance does not apply, since this "button" is not in and of itself a class, and therefore does not inherit.

In the two examples above, prior art systems represent state by constructing behavior. In other words, state is implemented by producing Java language instructions that modify the object instance after it is instantiated; therefore:
1. The state must also be induced from the behavior.
2. As part of the program source code, these instructions are a source of entropy, making the program more error prone, more difficult to maintain, and less capable of change.
3. The state is not inherited.

Continuing with this example, to appreciate the problem with inheritance, consider that the resulting state of this particular "button" is the culmination of its inherited state plus the changes to that state which were made on this particular "button" itself. There are two main ways which prior art systems have implemented this:
1. This particular "button" would contain the instructions required to fully configure its state as designed. This approach fails to provide inheritance because changes to classes from which this particular "button" derives would not be reflected in the instructions that configure the state of this "button."
2. This particular "button" would first execute the state configuration instructions of its super class (the class which it inherits from) and would then configure only the portion of its state that differs from the state of its super class. This approach is limited because of its recursive nature (i.e. the super class itself may have a super class); each class must redo the state configuration of its super class that differs from its own. As an example, consider the position portion of the "button" state. If the position of the super class is different from the position of this particular "button," then the "button" is positioned by the super class and then re-positioned by this "button" class. Since more than two levels of inheritance are common, the "button" could literally jump around the screen while it is being created. Although humorous as a visual example, the results would be less funny in a financial application.

Similar problems exist with containment. Generally, in the prior art, contained objects are not themselves classes and therefore do not have a class identity, an inherited state, customized behavior, or recursively containment elements capable of these same features. Furthermore, in order to support the inheritance of state, behavior, and containment of all classes, it is essential that, when a containing class is inherited, that the contained classes (and so on) be inherited as well. Since Java does not support containment, it obviously does not provide inheritance of contained objects.

FIGS. 1A and 1B illustrate general prior art principles that are characteristic of Java inheritance. Several phrases exist that describe inheritance: if a descendant class "D" inherits from an ancestor class "C," then it is said that "D is a C," that "D extends C," that "D inherits from C," that "D derives from C," and that "C is a super class of D." FIG. 1A shows a simple class inheritance hierarchy which exists in Java: a Button 2 "is a" 4 Component 6, which "is a" 8 Object 10. Furthermore, a Button 2 "is a" 4 and 8 Object 10, but this relationship is qualified as indirect, for example "Button indirectly inherits from Object" or simply "Button is a descendent of Object." (For reference, the fully qualified Java classes shown in FIG. 1A are java.lang.Object 10, java.awt.Component 6, and java.awt.Button 2.)

FIG. 1B shows a larger class inheritance hierarchy that exists in Java, incorporating the hierarchy from FIG. 1A. In this diagram, as in FIG. 1A, Component 14 "is a" Object 12, and Button 16 "is a" Component 14. Additionally, File 24 "is a" Object 12, Checkbox 18 "is a" Component 14, Container 20 "is a" Component 14, and Window 22 "is a" Container 20. The hierarchy is not limited in depth, and at any depth there can exist any number of classes. The design of the inheritance system mandates that each fully qualified class name be unique and that all classes inherit directly or indirectly from Object 12. (For reference, the fully qualified Java classes shown in FIG. 1B are java.lang.Object 12, java.awt.Component 14, java.awt.Button 16, java.awt.Checkbox 18, java.awt.Container 20, java.awt.Window 22, and java.io.File 24.)

In contrast to the "is a" of FIGS. 1A and 1B, FIGS. 2A and 2B pertain to containment. FIG. 2A illustrates a common use of containment, which is the containment of graphical objects. (The contained graphical objects are typically referred to as "controls" or "components." The containing graphical object is often a "window," "form," "pane," "site," or just "container.") Although the Java implementations of containment in the prior art vary widely, the concept of a container/containee relationship is extensively used for constructing complex objects, such as the object in FIG. 2A. In this figure, the Message 26 contains Text 28 and OK 30 and Cancel 32 buttons.

FIG. 2B extends the example slightly from FIG. 2A by adding recursive, or "nested," containment. Again, containment is a hierarchy in which a container can contain objects that are themselves containers. In FIG. 2B, Choices 38 is contained by Message 34 and Choices 38 in turn contains Shutdown 40, Restart 42, and Logoff 44. The expected visual representation of Choices 38 and the graphical controls that it contains would be a group of items, of which one and only one can be selected.

It is an object of the present invention to provide a data structure that fully describes the identity, state, behavior, and containment information related to the design of a software component. A related object is that software components contained therein be able to utilize the same data structure (a nested instance thereof) to describe their identity, state, behavior, and containment information.

It is another object of the present invention that the data structure can support the feature of inheritance with respect to the identity, state, behavior, and containment information. A related object is that software component information contained therein is inherited when the containing software component information is inherited; in other words, the inheritance applies to the entire containment hierarchy.

It is another object of the present invention that the data structure can be implemented for and can be fully compatible with the JVM, allowing use at any and all particular installations.

It is yet another object of the present invention that the data structure contains sufficient and unambiguous information in order to create Java classes from that information. A related object is that the resulting classes be Java software components capable of being assembled into or used in software applications and tools.

Still another object of the present invention is that the data structure enables the computing system to do the bulk of the work when updates or other changes are made to an instance of the data structure. Most significantly, this applies to the feature of inheritance, in which a change to the design of a software component impacts those software components that inherit from it. Additionally, this applies to software customization and localization, which produce component modifications for particular customers and locales. A related object is to enable the computing system to automatically detect and fix conflicts and redundancies caused by such changes.

Yet another object of the present invention is to provide a component data structure derived from a component data structure, wherein the derived component data structure elements can be reconstructed even if the base component data structure elements have been altered or removed. A related object of the present invention is to provide a "tag" associating the elements of a derived component data structure to the corresponding elements in the base component data structure.

Still another object of the present invention is to provide a delta component data structure wherein the elements of the delta component data structure are the differences between the elements of the base and the elements of the derived component data structures.

SUMMARY OF THE INVENTION

The above objects are met in computer systems operating in an object-oriented programming environment where the system or apparatus generates and maintains data structures for the design of components that are compatible with the Java Virtual Machine.

The data structures provide means for defining the Identity, State, Behavior and Containment of the components. The identity provides the super component from which the component inherits, and the name of the component itself. The state provides the declared properties of the component and any values for those properties. The behavior provides the declared methods of the component and any implementations for those methods. The containment declares the types of components that can be contained and includes the contained components themselves; the contained components are defined by nested versions of the inventive data structure.

The data structure finds particular advantage for providing software tools for Java compatible systems, and especially for application developers, systems integrators, and information services providers. Moreover, tools for installing and controlling revisions and modifications are more easily and accurately accommodated with the present inventive data structures since there is a reduction in the manual operations to effect changes.

Another advantage of the present invention, in a preferred embodiment, is that the data structure for one component that is derived from another may be held as the set of differences, a "delta," between the two data structures, rather than as a complete data structure. In this manner, inheritance is facilitated since the complete data structure for the derived component can be constructed by adding the delta data structure of the derived component to the complete data structure of the super component. In order to provide a robust implementation of the delta data structure, a "tag" is provided for each discrete unit of information within the component data structure; when changes are made to the super component, this tag correlates the information in the delta with the information in the super component. An additional advantage of the delta data structure is that it enables the customization and localization of components: by storing component customization and localization information as delta data structures, changes to non-customized and non-localized component data structures are inherited by their customized and localized counterparts. A further advantage of the delta data structure is that it uses less memory and storage space.

The inventive component data structures find further advantage by providing means for automatically, via the computer systems, incorporating changes among upgraded, customized and localized software applications, particularly in widely dispersed installations incorporating large software systems. Since changes made manually to a single component data structure are then automatically propagated to the impacted component data structures, the potential for human error is markedly reduced.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1A:
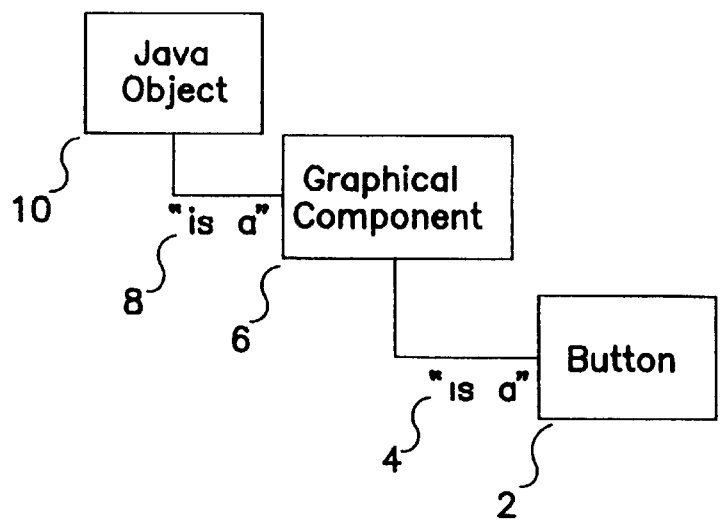
FIGS. 1A and 1B are hierarchical diagrams of prior art inheritance.
Figure 1B:
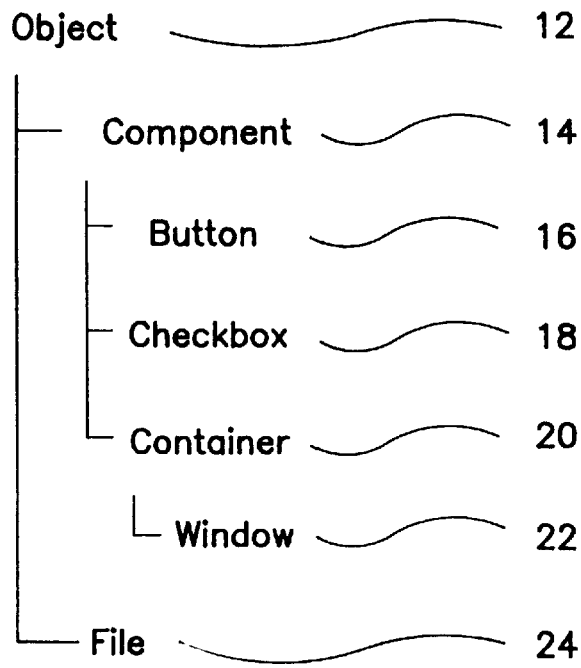
Figure 2A:
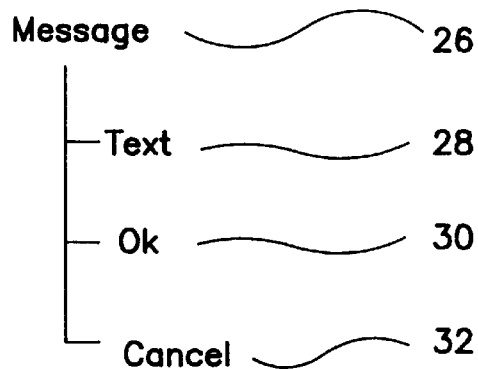
FIGS. 2A and 2B are hierarchical diagrams of prior art containment.
Figure 2B:
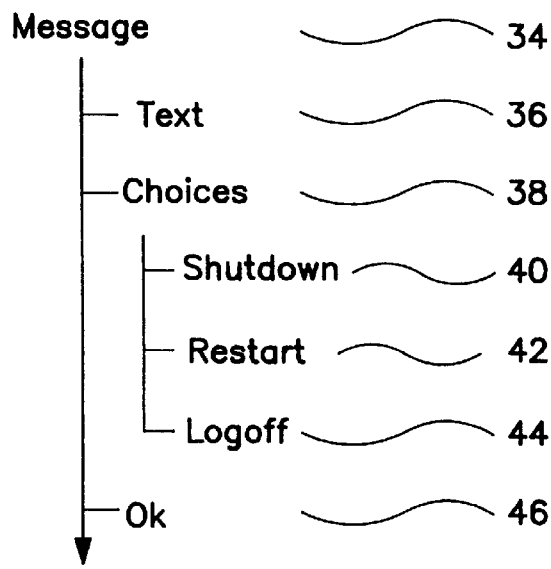
Figure 3A:
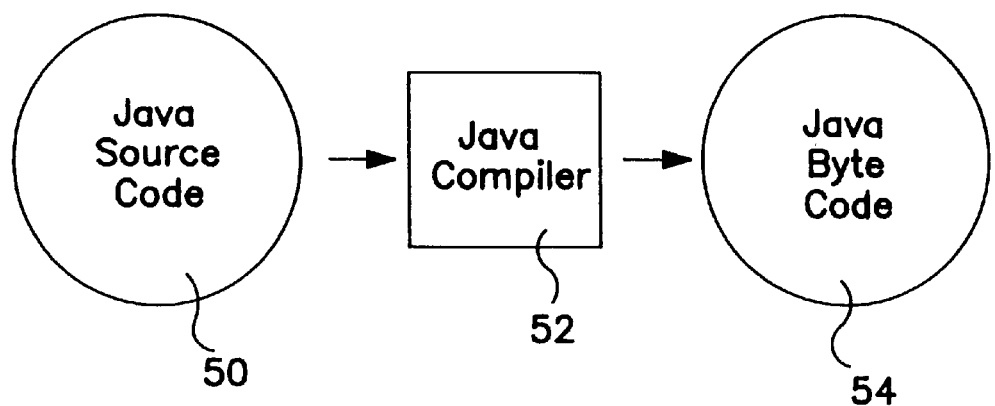
FIG. 3 is a diagram of a simplified prior art Java system.
Figure 3B:
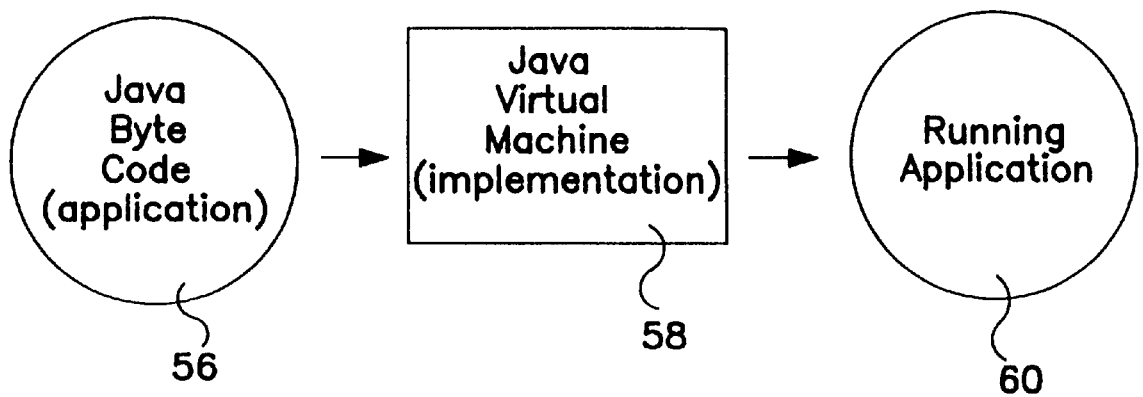

FIGS. 3A and 3B present a simplified typical Java system. In FIG. 3A, the Java compiler 52 transforms the input, Java source code 50, into a structure known as Java Byte Code 54 (also referred to as the "Java.class file format"). This Java Byte Code 54 exists as an interim step, which is then provided as input 56 in FIG. 3B to an implementation of the Java Virtual Machine 58, resulting in a running application 60. It should be noted that in some installations, the raw Java source code could be compiled to a platform-dependent executable code structure, omitting the intermediate step of Java Byte Code. However, most applications follow the system as in FIGS. 2A and 2B, and those that compile directly to executable code must still conform to the Java Virtual Machine Specification, (Sun Microsystems Inc., copyright 1997).

The import of FIGS. 3A and 3B is the realization that the JVM is universal and platform independent. This realization provides a path where software components, applications, and tools can be provided that are also universal and platform independent. In order to achieve this, there exists the single requirement of compatibility with the JVM standard. Once Java Byte Code 56 is formed, all of the many computing platforms that provide a JVM implementation 58 will be able to run the code 60. Furthermore, according to the Java Virtual Machine Specification, the JVM is independent of the source from which the Java Byte Code is formed: "the Java Virtual Machine does not assume that the instructions it executes were generated from Java source code. [There] have been a number of efforts aimed at compiling other languages to the Java Virtual Machine . . . " (Java Virtual Machine Specification, Chapter 7, "Compiling for the Java Virtual Machine").

Figure 6A:
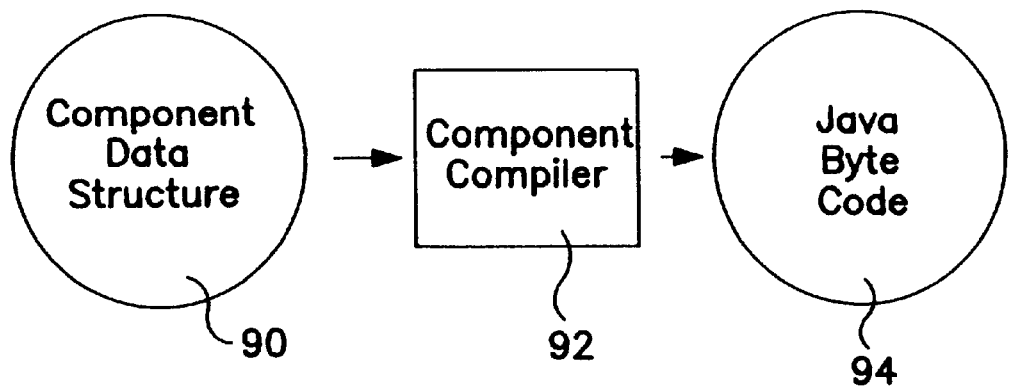
FIGS. 6A and 6B are diagrams of compiling the data structure for the JVM

Components are object classes in the broadest sense. The term component refers both to the design of the object class and the resulting output of the design. In the present invention, a preferred embodiment of a component is a data structure composed of identity, state, behavior, and containment, as displayed in FIG. 4. A preferred embodiment of the resulting compiled output is Java Byte Code, as illustrated in FIG. 6A. Additionally, the Java Byte Code adheres to the JavaBean standard. For these purposes, the term "component" will be used hereinafter.

Figure 4:
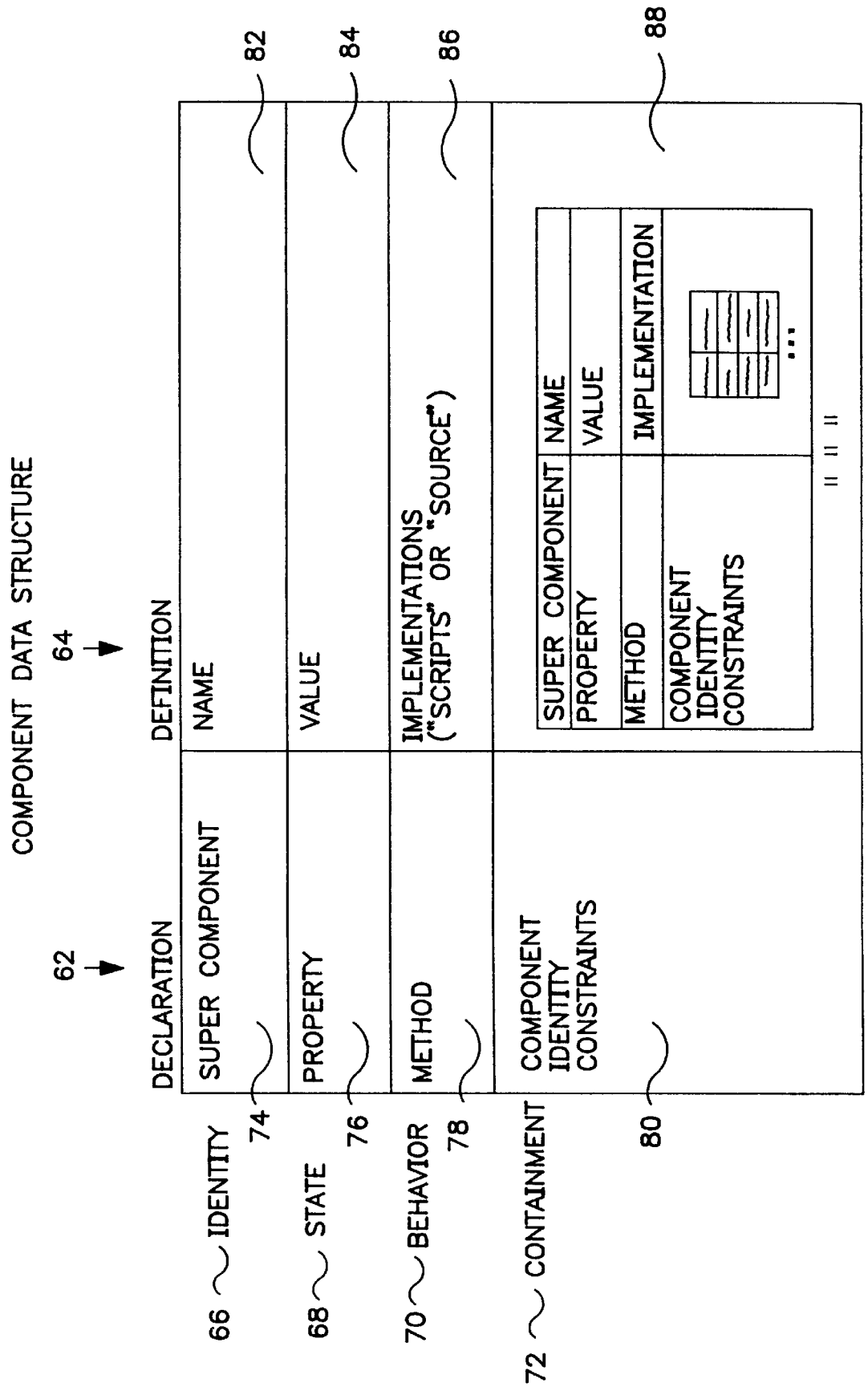
FIG. 4 is a diagram of the innovative data structure.

A preferred embodiment of the innovative component data structure is shown in FIG. 4. The organization of the data structure reflects the composition of a component as previously described: identity 66, state 68, behavior 70, and containment 72. Additionally, the data structure is conceptually divided between declaration 62 and definition 64; declaration describes information about a trait of the component and definition provides the actual "value."

In FIG. 4, identity 66 declares the "super component" 74 which is inherited from, and the identity or name 82 of the inheriting component. There exists exactly one "root component," named "Component" that has no super component; all other components inherit directly or indirectly from the root component. (A single root in an inheritance hierarchy is well known in the art. For example, Java has a root class known as java.lang.Object.) A preferred embodiment is such that the unique identity of a given component is constructed from both its super component 74 and its name 82. This provides hierarchical organization by inheritance. Furthermore, all components inheriting from a given component share a namespace unique to the component from which they inherit. For example, a component with the name 82 "Control" and inheriting from the root component ("Component") would have a unique identity "Component-.Control." (The hierarchical delimitation using a period is a standard in Java.) There are further elements in the declaration of a component's identity that reflect the particular standards and systems with which the component must comply. For example, the JavaBean specification defines how a component "dispatches" events to a JavaBean event listener interface.

In FIG. 4, state 68 declares properties 76 for which each may have a value 84 defined. The declaration of a property 76 most notably includes a name of the property, which uniquely identifies it within the component, and a data type. There are further elements in the declaration of a property that reflect the particular standards and systems with which the component must comply. For example, the JavaBean specification supports multiple values for an "indexed" property. The value 84 of a property is constrained by the declaration of the property 76, for example by the data type.

In FIG. 4, behavior 70 declares methods 78 each with optional implementations 86 defined. The declaration of a method 78 most notably includes the name and parameters of the behavior, which uniquely identifies it within the component, and a return data type. There are further elements in the declaration of a behavior that reflect the particular standards and systems with which the component must comply. For example, the Java Language Specification provides a manner to declare "exceptions" that a method can "throw." Each implementation 86 provides the information necessary to be compiled into the instruction code of the particular systems. A preferred embodiment specifies the "language" of implementation and an implementing "script," where the language is used to determine the manner of compiling the script.

In FIG. 4, containment 72 declares component identity constraints 80, which are the types of components that can be contained within this component, and defines those components 88 that are contained. The ability to declare containment 72 is based on the unique identity 66 that each component has. For example, if this component identity constraint 80 limits containment to "Component.Control," then only the component "Component.Control" and any component inheriting directly or indirectly from it may be contained within this component.

In FIG. 4, this same component data structure is used recursively to hold the component information for a contained component 88. The only difference is that the contained component's unique identity is constructed from its name and its containing component. For example, if a component inheriting from "Component.Control.Button" and named "OK" is contained within the component "Component.Control.Container.Window.Message" (see FIG. 2A), then the unique identity of the OK button is "Component-.Control.Container.Window.Message$OK." In other words, the containing component provides a namespace for the components it contains. (The delimitation using a dollar sign is a standard in Java for inner classes.)

In order to support component inheritance, features such as containment that rely on inheritance, and the customization and localization of components, it is necessary that the differences between two components be both determinable and applicable. For these purposes, the terms Base, Derived, and Delta will be defined:

Base—A data structure assumed to contain complete and correct information;

Derived—A data structure originally identical to the Base data structure but which may have since changed; and Delta—The specific changes that must be applied to the Base data structure in order to produce the Derived data structure.

Figure 5A:
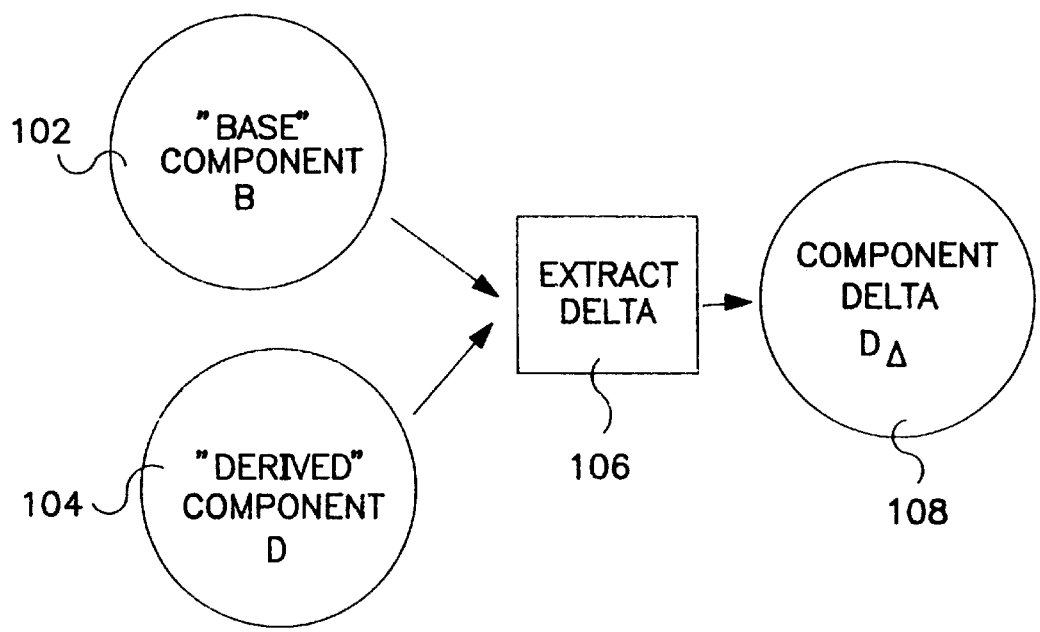
FIGS. 5A and 5B are diagrams of how component inheritance is managed.
Figure 5B:
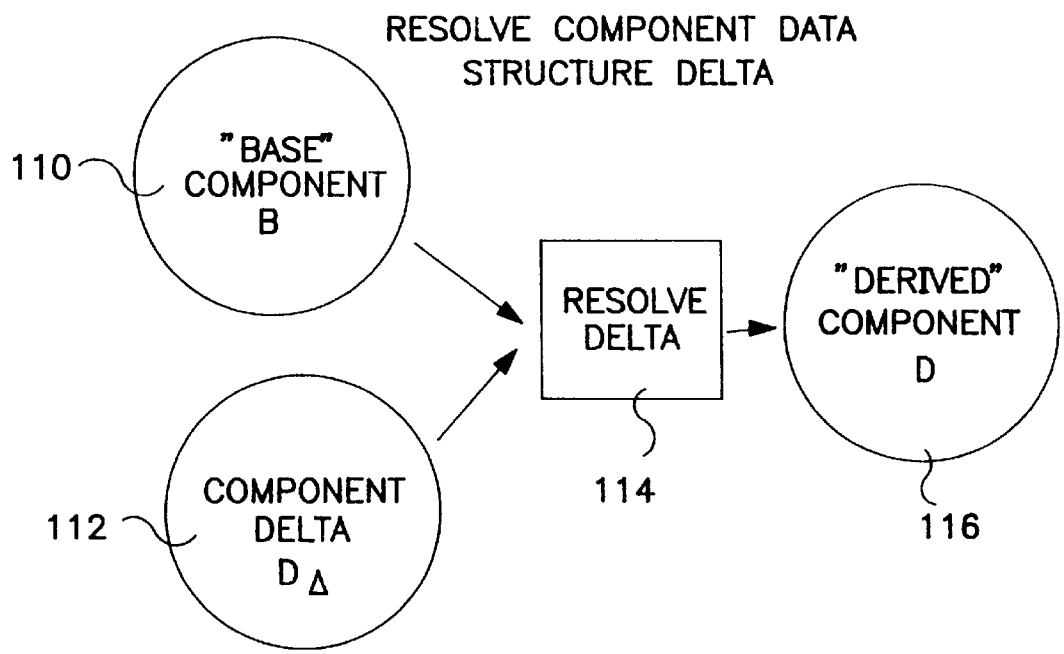

FIGS. 5A and 5B illustrate the above terms with respect to the component data structure. In FIG. 5A, a component delta "$D_A$" 108 is extracted 106 from the derived component "D" 104 of the base component "B" 102. Thus, it must be possible to determine those differences between "B" and "D" that are legal and store those differences in the form of a delta.

By keeping the resulting component delta "D$_A$" 108, subsequent changes to the base component "B" are reflected in the derived component "D" without losing those qualities of "D" that made it different from "B." This is illustrated in FIG. 5B, in which the application ("resolve delta" 114) of the component delta "D$_A$" 112 to the base component "B" 110 results in the derived component "D" 116.

In a preferred embodiment, there are two categories of differences ("deltas") between components:

1. A component derivation represents the differences between a component and its super component; the component derivation is therefore the result of an "inheritance" relationship between two components 2. A component modification represents the changes made to a component as a result of versioning, customization, or localization; the component modifications is therefore the result of comparing two different "versions" of the same component In a preferred embodiment, both the component derivation and modification are themselves component data structures; however, instead of carrying complete component information, these data structures carry only the information necessary to reconstruct the derived component from the base component. Additionally, each element (for example, property, method, and contained component) in a base component and the corresponding element in a derived and/or modified component includes a uniquely identifying datum (a "tag", which is an implementation of a unique identifies, UID, a term well known in the art) which is used to ensure the integrity and organizations for a correct reconstruction of the derived component even if elements of the base component have been added, removed, and renamed. When the delta elements (see above) are originally extracted, the tag for the elements of the base component is duplicated in the corresponding elements of the derived component thereby uniquely associating the base and derived elements to each other. The tag for each particular element remains constant for the life of that element.

Figure 6B:
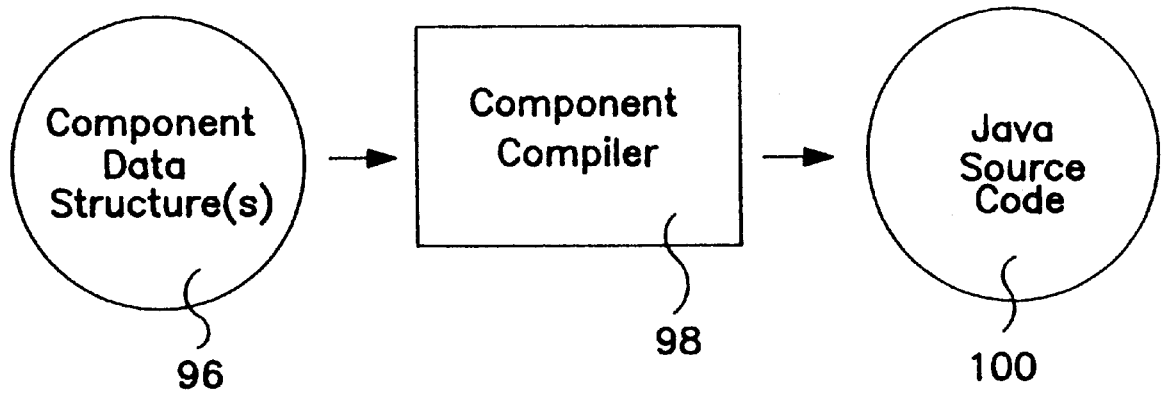

FIG. 6A illustrates the manner in which the innovative data structure is compiled into Java Byte Code, thus fulfilling the single requirement of compatibility with the JVM standard illustrated in FIG. 3B. It is therefore important to ensure that the component data structure is constrained by the JVM specification such that legal Java Byte Code will be produced for the component data structure. As shown in FIG. 6B, it is also possible that the component data structure be compiled first into Java source code and then, as shown in FIG. 3A, be compiled into Java Byte Code.

In a preferred embodiment, the component data structure is written in Java, is compatible with the JVM, and compiles to produce legal JVM classes. The component data structure must be such that it can be stored and, when stored, it can be loaded, that the computing systems accommodate the component, and that the component meets any applicable standard.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. An object-oriented component data structure of a Java compatible type for defining components, for use in a computer system providing enhance inheritance, comprising:

a) means for defining a first component data structure and a second component data structure, b) means for associating said first with said second component data structures, thereby allowing said first component data structure to inherit from said second component data structure, c) means for organizing said first and second component data structures in a hierarchy according to said inheritance, d) means for querying and modifying said first and second component data structures, e) means for maintaining the integrity and organization of said first and second component data structures f) means for containing said component data structures and the inheriting of said contained component data structures to he recursive, g) means for defining the identity, state, and behavior of contained component data structures, and h) means for the computer system to organize the contained component data structures in a hierarchy according to containment.

2. The object oriented component data structure as defined in claim 1 further comprising means for defining multiple hierarchical levels according to inheritance of data structures.

3. The object oriented component data structure as defined in claim 1 wherein the first component data structure comprises means for defining an identity of said first component data structure, wherein said identity inherits from said second component data structure.

4. The object oriented component data structure as defined in claim 3 further comprising:

a) means for defining a state of said first component data structure, and b) means for defining a behavior of said first component data structure, wherein said state and behavior of said first component data structure are inherited from said second component data structure.

5. The object oriented component data structure as defined in claims 4 further comprising:

a) means for containing third component data structures within the second component data structure, and b) means for containing fourth component data structures within the first component data structure, wherein said fourth component data structures inherit from the third component data structures.

6. The object oriented component data structure as defined in claim 5 wherein identity comprises the name of the component data structure, wherein said state comprises the properties of the component data structure and the value of said properties, wherein said behavior comprises how the component data structure operates and the code necessary to implement said operation, and wherein containment comprises the component data structures that are contained within the component data structure.

7. The object oriented component data structure as defined in claim 6 wherein said data structure is substantially consistent with the Java Virtual Machine standard, and further comprising means for creating Java Virtual Machine class file structures.

8. The object oriented component data structure as defined in claim 6 wherein said data structure is substantially consistent with the JavaBean component model standard, and further comprising means for creating Java Virtual Machine class file structures which are JavaBean components.

9. The object oriented component data structure for components as defined in claim 5 wherein said first data structure comprises:

f) means for uniquely tagging each element in said second data structure, g) means for tagging each element in said first data structure, wherein said tagging relate the corresponding elements in the first and the second data structures, so that changes to elements in the second data structure can be related to the corresponding elements in the first data structure.

10. The object oriented component data structure as defined in claim 5 wherein said first component data structure comprises:

means for determining the differences between said first and said second component data structure, and means for storing as a delta the information that is different between said first and said second component data structures.

11. A method for defining object-oriented component data structures of Java compatible types for defining components, for use in a computer system, providing enhanced inheritance, comprising the steps of:

a) defining a first component data structure and a second component data structure, b) associating said first with said second component data structures, thereby allowing said first component data structure to inherit from said second component data structure, c) organizing said first and second component data structures in a hierarchy according to said inheritance, d) querying and modifying said first and second component data structures, e) maintaining and retaining the integrity and organization of said first and second component data structures in said hierarchy, f) containing component data structures and the inheriting of said contained component data structures to be recursive, g) defining the identity, state, and behavior of contained component data structures, and h) organizing the contained component data structures in a hierarchy according to containment using a computer system.

12. The method as defined in claim 11 further comprising the step of defining multiple hierarchical levels according to inheritance of data structures.

13. The method as defined in claim 12 wherein the step of defining a first component data structure comprises the step of:

identifying said first component data structure, wherein said identity inherits from said second component data structure.

14. The method as defined in claim 13 further comprising the steps of:

defining a state of said first component data structure, and defining a behavior of said first component data structure, wherein said state and behavior of said first component data structure are inherited from said second component data structure.

15. The method as defined in claims 14 further comprising the steps of:

a) containing third component data structures within the second component data structure, and b) containing fourth component data structures within the first component data structure, wherein said fourth component data structures inherit from the third component data structures.

\* \* \* \* \*